United States Patent
Schmidt et al.

(10) Patent No.: US 6,843,384 B2
(45) Date of Patent: Jan. 18, 2005

(54) FUEL TANK

(75) Inventors: Rainer Schmidt, Graben-Neudorf (DE); Klaus Nagler, Bischweier (DE); Hartwig Hartung, Karlsruhe (DE)

(73) Assignee: TI Group Automotive Systems Technology Center GmbH, Rastatt (DE)

( * ) Notice: Subject to any disclaimer, the term of this patent is extended or adjusted under 35 U.S.C. 154(b) by 184 days.

(21) Appl. No.: 10/043,996

(22) Filed: Jan. 11, 2002

(65) Prior Publication Data

US 2002/0100759 A1 Aug. 1, 2002

(30) Foreign Application Priority Data

Jan. 31, 2001 (DE) .......................................... 101 04 511

(51) Int. Cl.[7] .............................. B65D 6/00; B65D 8/00
(52) U.S. Cl. ...................... 220/4.13; 220/4.14; 220/562
(58) Field of Search .............................. 220/4.14, 4.13, 220/562

(56) References Cited

U.S. PATENT DOCUMENTS 4,526,286 A * 7/1985 Jung et al.
6,138,859 A * 10/2000 Aulph et al.
6,338,420 B1 * 1/2002 Pachciarz et al.

* cited by examiner

Primary Examiner—Joseph Man-Fu Moy
(74) Attorney, Agent, or Firm—Reising, Ethington, Barnes, Kisselle, P.C.

(57) ABSTRACT

An internal reinforcement structure of a plastic fuel tank resists deformation of opposing walls of the fuel tank and provides an integral, and directionally sensitive, stress relief feature when pre-determined forces are exceeded. The stress relief feature is contained within a fuel chamber of the fuel tank defined by the opposing walls. Each wall has an inward projecting indentation of the structure which engage one-another at their distal ends or bottom portions, preferably, via a welded plastic engagement area. The indentations have a consistent wall thickness which has a higher cross-sectional area than the stress relief feature causing the stress relief feature to tear as opposed to the tank walls thereby assuring fuel tank integrity.

19 Claims, 2 Drawing Sheets

FUEL TANK

REFERENCE TO RELATED APPLICATION

Applicants claim priority of German patent application Serial. No. 10104511.5, filed Jan. 31, 2001.

FIELD OF THE INVENTION

This invention relates to a fuel tank, and more particularly to a fuel tank having a reinforcing structure with an integral stress relief feature.

BACKGROUND OF THE INVENTION

For safety purposes, fuel tanks must withstand forces produced by predetermined internal and external pressure differentials, transients and stresses. This is particularly true for tanks made of plastic or high density polyethylene, HDPE. Pressure transients are typically caused by environmental temperature changes. For example, a temperature rise of the tank, or the fuel contained therein, will cause the internal tank pressure to rise and deflection or deformation of the shell of the tank to occur. Uncontrolled deformation and/or expansion of the tank must be avoided to prevent the tank shell from contacting the vehicle body, which could lead to the transmission of noise to the passenger compartment of the vehicle or to damage of the tank shell and ensuing fuel leakage. The weight of the fuel contained within the tank may also lead to a deformation of the shell contour. One method to ensure the shape integrity of the tank is to use retainer straps externally clamping the tank shell. Unfortunately, this causes an increase of the assembly and mounting labor or effort and also increases materials costs, all of which ultimately increases the total production costs. Moreover, such measures provide no or only limited protection against external forces or vacuum or sub-atmospheric pressure conditions inside the tank.

A further known method utilizes one or multiple kiss-off members, or reinforcing structures inside the tank. The structures typically have two opposing indentations projecting inwardly and molded into respective opposing walls of the tank. The indentations "kiss" or engage and are welded to each other at their distal ends thereby decreasing deflection of the shell and increasing the shape stability of the tank. This increases tank rigidity, however, it tends to increase the opportunity of tank wall tears causing fuel tank leaks when internal pressure within the tank is excessive or external forces exerted upon the tank are extreme.

The distal ends of the opposing indentations are engaged by a spot-like or essentially circular weld. Desirably, the engagement area serves not only as a structural feature but also would serve as a yield feature which tears upon excessive forces so that the tank wall or shell does not otherwise tear. The engagement area, however, is difficult to control and/or define in production. Experiments have shown that with this type of point-like spot weld it is very difficult to obtain the desired yield behavior, since the effective wall thickness is larger at the weld than in the surrounding region. Thus, it is observed that often it is the surrounding wall region and not the weld area that yields, resulting in leakage from the tank.

SUMMARY OF THE INVENTION

An internal reinforcing structure of a plastic fuel tank resists deformation and tearing of opposing walls of the fuel tank and provides an integral, and directionally sensitive, stress relief feature when predetermined forces are exceeded. The stress relief feature is contained within a fuel chamber of the fuel tank defined by the opposing walls. Each wall has an inward projecting indentation of the structure which engage one-another at their distal ends or bottom portions, preferably, via a welded plastic engagement area. The indentations have a consistent wall thickness which has a higher cross-sectional area than the stress relief feature causing the stress relief feature to tear or separate as opposed to the walls thereby assuring fuel tank integrity and avoiding fuel leakage.

Preferably, the stress relief feature includes the engagement area located between bottom portions of the opposing indentations. The weld area is preferably annular in shape and encircles a void carried between the two bottom portions. Preferably, the tear or separation of the annular engagement area begins at an opening which lies in the same imaginary plane as the weld engagement area and communicates between the void and the chamber.

Objects, features, and advantages of this invention include providing a fuel tank with a reinforcing structure capable of flexing and separating when extreme forces are exerted upon the tank so the external walls do not tear which would lead to fuel tank leakage, has a limited number of parts, and provides a relatively simple, low cost, rugged, durable, and reliable fuel tank.

BRIEF DESCRIPTION OF THE DRAWINGS

These and other objects, features and advantages of this invention will be apparent from the following detailed description, appended claims and accompanied drawings in which:

DETAILED DESCRIPTION OF THE PREFERRED EMBODIMENTS

Figure 1:
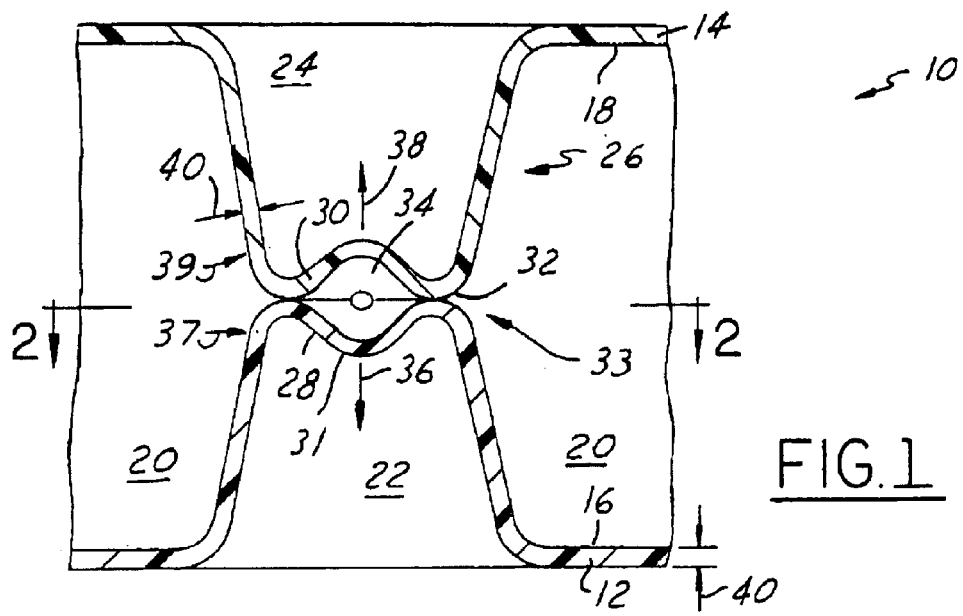
FIG. 1 is a partial cross section view of a fuel tank illustrating a reinforcing structure of the present invention.
Figure 2:
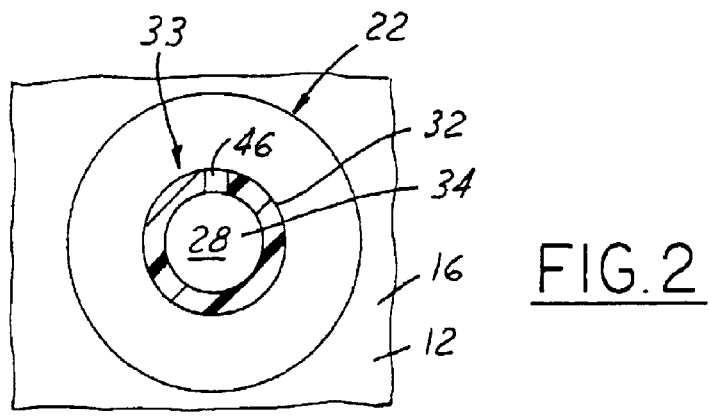
FIG. 2 is a cross section of the reinforcing structure illustrating a stress relief feature, and taken along line 2—2 of FIG. 1.

Referring in more detail to the drawings, FIG. 1 illustrates a fuel tank 10 made of a high density polyethylene (HDPE) plastic or a multi-layered plastic shell utilizing a blow molding process. The tank 10 has mutually opposed and substantially parallel walls 12, 14 having respective interior surfaces 16, 18 which substantially face one-another defining a primary fuel chamber 20 between them. Walls 12, 14 unitarily form respective deep indentations 22, 24 which project into the fuel chamber 20 toward one-another to form a support or reinforcing structure or kiss-off member 26. As best shown in FIG. 2, interior surface 16 adheres to interior surface 18 at the distal ends or bottom portions 28, 30 of the respective indentations 22, 24 via a weld thereby forming an annular engagement area 32 of a stress relief feature 33 which will yield or separate upon the exertion of excessive shear forces before wall 12 or wall 14 tear themselves. The engagement area 32 is substantially evenly annular, so that the width does not vary appreciably along its circumference. This favorably influences the yield, tearing or separation characteristics through the welded annular engagement area 32. Yielding of the weld or annular engagement area 32, instead of the walls of the fuel tank shell, assures that the fuel tank 10 and/or permeation barriers thereof will not leak or permeate fuel vapor as a result of a vehicle accident.

Figure 3:
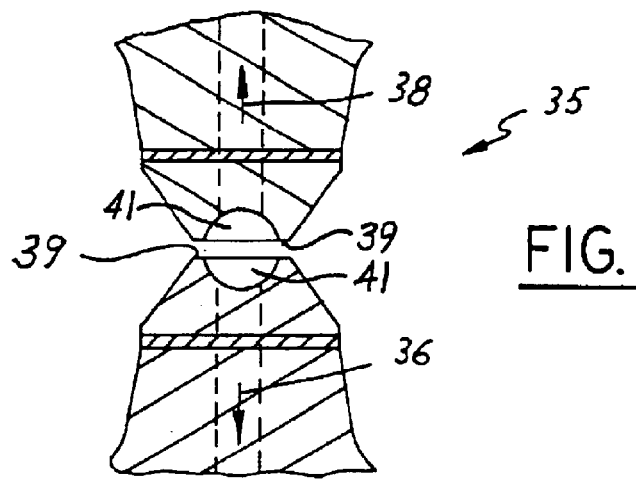
FIG. 3 is a partial cross section of a blow molding tool for forming the reinforcing structure.

The interior surfaces 16, 18 enclosed by the engagement area 32 and carried by the bottom portions 28, 30 define a substantially hollow sphere or void 34. In other words, bottom portions 28, 30 of respective indentations 22, 24 resemble minor reverse indentations or dome portions 31 projecting in an outward direction with reference to the fuel tank 10. When manufacturing a plastic fuel tank 10 made by a blow molding process, the void 34 is created by the use of tooling 35 (as best shown in FIG. 3) which subjects the walls 12, 14 to a vacuum in the direction of arrows 36, 38. The tool 35 is divided into two halves each forming one of the indentations 22, 24 and having an annular portion 39 that corresponds to the annular engagement area 32 and a semispherical recess 41 forming one of the domed portions 31. The vacuum assures that an essentially constant wall thickness 40 is attained in the region of the indentations 22, 24 and is dependent on the ratio of the diameter of the annular area 32 to the volume of the hollow region or spherical void 34. By controlling the height and diameter of the semispherical contour the essentially constant wall thickness 40 in the region of the reinforcing structure is achieved.

Figure 4:
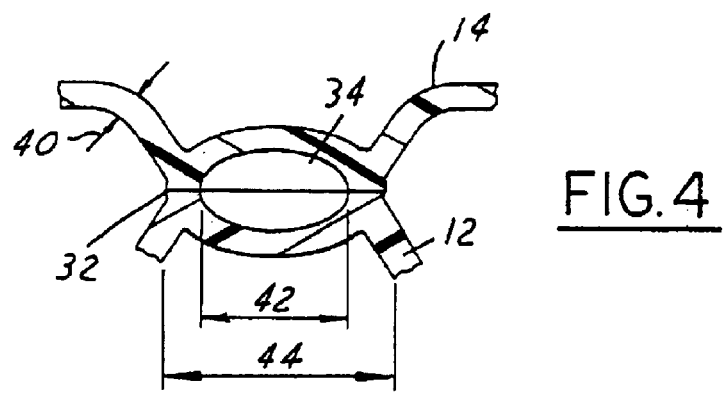
FIG. 4 is an enlarged cross section of the reinforcing structure of FIG. 1.

If the engagement area 32 were of a spot-like or solid weld, without the void 34, or if the annular engagement area 32 was too large, it is likely that the welded area engagement 32 would not yield, and instead a tear through either wall 12, 14 designated by the arrows 37, 39 in the region of the indentations 22, 24 would occur causing a fuel leak from the tank 10. To prevent this tearing, a criterium for the dimension of the annular engagement area 32 is desirable. The area of the annular engagement 32 is thus smaller than the total cross sectional area of the reinforcing structure 26, and must be smaller than a minimum cross sectional area $A_S$ of either tank wall 12, 14 which would otherwise represent the location of an undesired tank wall tear. Referring to FIG. 4, the tear area $A_S$ is calculated from the inner diameter 42 of the annular engagement 32 and the minimum wall thickness 40 of either wall 12, 14 in the region of the annular engagement. The equation is as follows:

$A_S = (\pi)$ (inner diameter 42) (minimum wall thickness 40), or $A_S = \pi D_{42} T_{40}$ where $D_{42}$ is the inner diameter 42, and $T_{40}$ is the minimum wall thickness in the annular engagement 32 region. In a similar manner, the area of the annular engagement 32 can be calculated from its inner diameter 42 and outer diameter 44, as follows:

Area $32 = [(\pi)/(4)][$(outer diameter 44)$^2 -$(inner diameter 42)$^2]$, or $A_{32} = (\pi/4)(D_{44}^2 - D_{42}^2)$ where $D_{44}$ is the outside diameter of the annular engagement 32. Experiments have shown that a dependable yield or separation of the welded annular engagement area 32 is obtained when the engagement area 32 is not more than seventy five percent of $A_S$, i.e. $A_{32} \leq \frac{3}{4} A_S$. Making engagement area 32 even smaller with respect to $A_S$ introduces a greater safety margin for the yielding of the engagement area 32.

As best illustrated in FIGS. 1 and 2, the pressure between the void 34 and the chamber 20 remains equal during the manufacturing cooling process via an opening 46 of the stress relief feature 33 which extends there between. The annular engagement area 32 is therefore not a closed ring, but one interrupted by at least one opening 46. Opening 46 further supports interior cooling of the void 34 which, along with equalized pressure, leads to a constant wall thickness 40 and an increase in shape stability of the walls 12, 14 during removal of the tank 10 from the mold.

The opening 46 of the stress relief feature 33 further provides a deliberate, directional, weakening of the annular engagement area 32. The opening 46 extends radially through and is co-planar to the engagement area 32, lying in the same imaginary plane. The circumferential orientation of the opening 46 is determined theoretically or empirically and generally extends in the direction of the expected problematic internal or external forces exerted upon the tank 10 during a vehicle accident. The opening 46 thereby forms a starting point for a bust-tear through the annular area 32 when a critical force is exceeded. If multi-directional forces are expected, then more than one such opening 46 may be provided for pressure relief or propagation separation. When a force is sufficient to cause a tear through the reinforcing structure 26, acting in the direction of the pressure relief opening 46, an even tear occurs through the engagement area 32 only, and without adverse tears through the walls 12, 14, which could lead to leaks from the tank 10.

Figure 5:
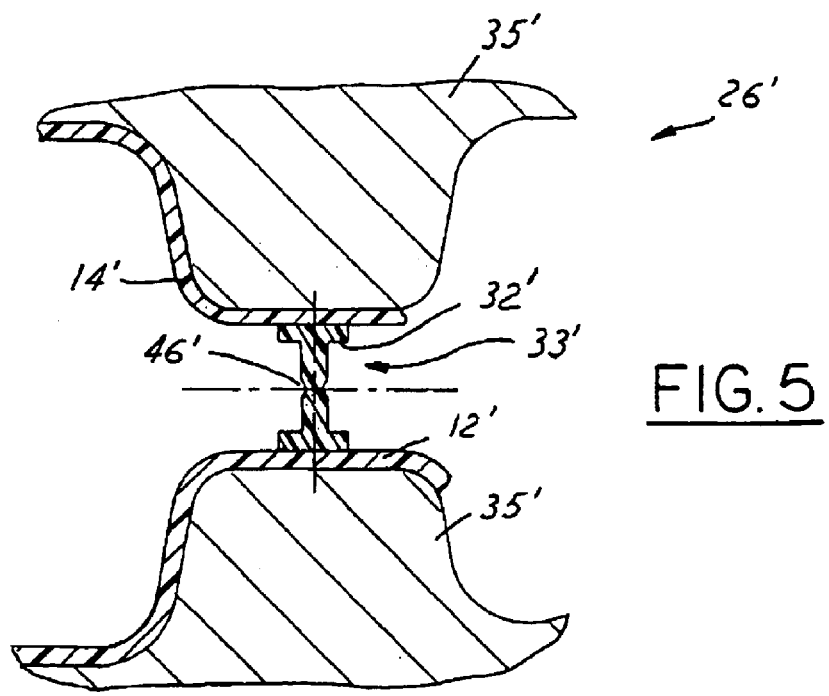
FIG. 5 is a second embodiment of a reinforcing structure.

Referring to FIG. 5, a second embodiment of a reinforcing structure 26' is shown wherein the annular engagement area 32 and the opening 46 of the stress relief feature 33 of the first embodiment is replaced with a plastic stress relief bar 32' with a groove 46' providing a stress relief feature 33'. The bar 32' is engaged at both ends to respective plastic fuel tank walls 12', 14' via tear resistant welds or adhesives. The bar 32' is preferably injection molded and is placed within the plastic parison while blow molding the fuel tank and before the blow molding tooling 35' is closed. The stress relief bar 32' carries the lateral groove 46' disposed approximately at mid-section. Groove 46' provides the starting point for a bust-tear through the bar 32' when a predetermined internal or external pressure or force is exceeded. The bar 32 may have a variety of shapes in lateral cross section including circular, oval and retangular. However, the lateral cross section of the bar 32' at the groove 46' is substantially smaller than the cross section of wall 12' or wall 14' or any indentation formed therein. Similar to the first embodiment, the lateral cross section of the bar 32' at the groove 46' is seventy five percent or less the cross section of either indentation of wall 12' or wall 14' substantially near the respective weld of the bar 32'.

Figure 6:
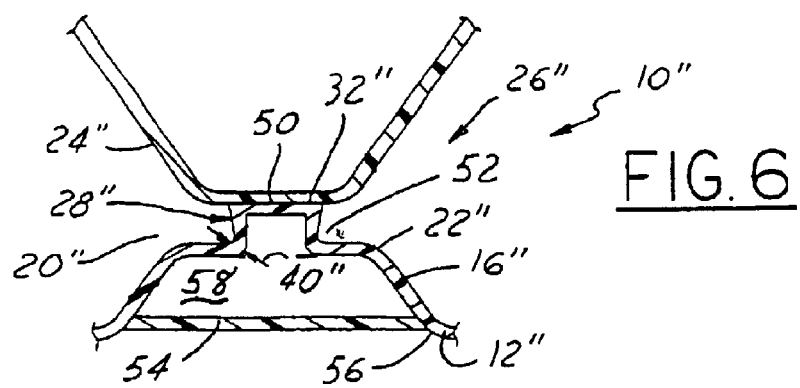
FIG. 6 is a third embodiment of a reinforcing structure.

Referring to FIG. 6, a third embodiment of a reinforcing structure 26" is shown wherein the annular engagement area 32 of the first embodiment is replaced with a solid rectangular or square engagement area 32". An indentation 22" has a bottom portion or hollow protrusion 28" which, unlike the first embodiment, projects further into a fuel chamber 20" defined by a tank 10". A distal end 50 of the protrusion 28" is carried by an interior surface 16" of a wall 12" which unitarily forms the indentation 22", and is rectangular in shape and thus defines the shape of the engagement area 32" which provides the engagement to an opposing indentation 24". Indentation 24" has a consistent wall thickness which is greater than a minimum wall thickness 40" of the indentation 22" located at an acute juncture 52 disposed between the protrusion 28" and the remaining indentation 22".

Unlike the first and second embodiments, when an internal or external force is applied to the reinforcing structure 26" a tear occurs through the wall 12" at the minimum wall thickness 40" of the indentation 22". A plug or welded plate 54 engaged sealably to an exterior surface 56 of the wall 12" prevents leakage of fuel out of the tank 10". Any fuel leakage through wall 12" is contained within a secondary chamber 58 carried between the exterior surface 56 at the indentation 16" and the plug 54.

While the forms of the invention herein disclose constitute presently preferred embodiments, many others are possible. For instance, the fuel tank and reinforcing structure need not be plastic, but can be made of metal or any other variety of materials. Moreover, adherence of the engagement area 32 can be achieved via an adhesive in place of the weld. It is not intended herein to mention all the equivalent forms or ramifications of the invention, it is understood that the terms used herein are merely descriptive rather than limiting and that various changes may be made without departing from the spirit or scope of the invention.

What is claimed is:

1. A reinforcing structure of a fuel tank having a first and an opposing second wall defining a fuel chamber, the reinforcing structure comprising:
    a first indentation carried unitarily by the first wall and extending into the fuel chamber, the first indentation having a bottom portion engaged to the opposing second wall; and
    a stress relief feature disposed within the chamber, the stress relief feature having an engagement area being annular in shape and thus formed by the engagement of the bottom portion to the opposing second wall.

2. The reinforcing structure set forth in claim 1 comprising a second indentation carried unitarily by the second wall, the second indentation having a bottom portion wherein the stress relief feature is formed between the bottom portions of the first and second indentations.

3. The reinforcing structure set forth in claim 2 wherein the bottom portions of the first and second indentations enclosed by the annular engagement area form a void.

4. The reinforcing structure set forth in claim 3 wherein the stress relief feature has a radial opening communicating between the void and the chamber and for providing a starting point for a bursting tear through the annular engagement area when a predetermined internal or external pressure is exceeded.

5. The reinforcing structure set forth in claim 4 wherein the circumferential orientation of the opening is dependent upon the direction of adverse forces exerted upon the tank.

6. The reinforcing structure set forth in claim 3 wherein the bottom portions of the first and second indentations have a substantially constant wall thickness, and wherein the engagement area is seventy-five percent or less than the cross-sectional area of either adjacent indentation.

7. The reinforcing structure set forth in claim 6 wherein the fuel tank is a multi-layered structure of plastic material and is formed by a blow molding process.

8. A fuel tank comprising:
    first wall;
    a second wall opposed to the first wall;
    a fuel chamber defined between the first and second walls;
    a reinforcing structure having a first indentation unitary with the first wall, projecting into the chamber from the first wall and having a bottom portion;
    a second indentation unitary with the second wall, projecting into the chamber from the second wall and having a bottom portion generally opposed to the bottom portion of the first indentation; and
    a stress relief feature disposed within the chamber, and the stress relief feature is adhered to the bottom portion of the first indentation and adhered to the bottom portion of the second indentation which will yield upon excessive force being applied to the walls before the walls tear.

9. A fuel tank comprising:
    a first wall;
    a second wall opposed to the first wall;
    a chamber defined between the first and second walls;
    a reinforcing structure having a first indentation unitary to the first wall, projecting into the chamber from the first wall and having a bottom portion;
    a second indentation unitary to the second wall, projecting into the chamber from the second wall and having a bottom portion;
    a stress relief feature disposed within the chamber, engaged to the bottom portion of the first indentation and engaged to the bottom portion of the second indentation; and
    the stress relief feature is disposed between the bottom portions of the first and second indentations and wherein the bottom portions are engaged directly by an engagement area of the stress relief feature.

10. The fuel tank set forth in claim 9 wherein the engagement area is welded and annular in shape, and wherein the bottom portions disposed radially inward from the engagement area form a substantial spherical void.

11. The fuel tank set forth in claim 10 wherein the stress relief feature has a radial opening communicating between the chamber and the void.

12. The fuel tank set forth in claim 11 wherein the radial opening and the engagement area are disposed along an imaginary plane.

13. A fuel tank comprising:
    a first wall;
    a second wall opposed to the first wall;
    a chamber defined between the first and second walls;
    a reinforcing structure having a first indentation unitary to the first wall, projecting into the chamber from the first wall and having a bottom portion;
    a second indentation unitary to the second wall, projecting into the chamber from the second wall and having a bottom portion;
    a stress relief feature disposed within the chamber, engaged to the bottom portion of the first indentation and engaged to the bottom portion of the second indentation; and
    the stress relief feature has an elongated stress relief bar disposed within the chamber and engaged between the first and second indentations at opposing ends.

14. The fuel tank set forth in claim 13 wherein the stress relief feature has a groove carried transversely by the bar and for providing a starting point for a bursting tear through the bar when a predetermined internal or external pressure is exceeded.

15. The fuel tank set forth in claim 14 wherein the stress relief bar is made of plastic.

16. The fuel tank set forth in claim 9 wherein the stress relief feature includes a hollow protrusion projecting acutely via a juncture into the chamber from the end portion of the second indentation; and
    wherein the hollow protrusion engages the bottom portion of the first indentation.

17. The fuel tank set forth in claim 16 comprising:
    the second wall having an interior surface exposed to the chamber and an exterior surface;
    a plug engaged sealably to the exterior surface of the second wall at the second indentation; and
    a secondary chamber defined by the second indentation and carried between the exterior surface of the second wall and the plug.

18. The fuel tank set forth in claim 17 wherein the smallest wall thickness defined between the interior and exterior surfaces of the second wall is located at the juncture of the second indentation, and wherein the cross-sectional area of the second indentation at the juncture is smaller than the cross-sectional area of the distal end of the protrusion.

19. The fuel tank set forth in claim 18 wherein the distal end is square in shape.

* * * * *

UNITED STATES PATENT AND TRADEMARK OFFICE
CERTIFICATE OF CORRECTION

PATENT NO.   : 6,843,384 B2
DATED        : January 18, 2005
INVENTOR(S)  : Rainer Schmidt et al.

It is certified that error appears in the above-identified patent and that said Letters Patent is hereby corrected as shown below:

<u>Column 5,</u>
Line 49, before "opposed" insert -- generally --.

Signed and Sealed this

Twenty-sixth Day of April, 2005

JON W. DUDAS
*Director of the United States Patent and Trademark Office*